(12) United States Patent
Jeung et al.

(10) Patent No.: US 11,804,616 B2
(45) Date of Patent: Oct. 31, 2023

(54) BATTERY PACK MANUFACTURING APPARATUS AND METHOD, AND BATTERY PACK

(71) Applicant: LG CHEM, LTD., Seoul (KR)

(72) Inventors: Seok-Won Jeung, Daejeon (KR); Hyeong-Min Park, Daejeon (KR); Geon-Tae Park, Daejeon (KR); Jung-Ho Oh, Daejeon (KR); Ju-Hwan Baek, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 447 days.

(21) Appl. No.: 17/044,068

(22) PCT Filed: Feb. 10, 2020

(86) PCT No.: PCT/KR2020/001838
§ 371 (c)(1),
(2) Date: Sep. 30, 2020

(87) PCT Pub. No.: WO2020/175816
PCT Pub. Date: Sep. 3, 2020

(65) Prior Publication Data
US 2021/0167412 A1    Jun. 3, 2021

(30) Foreign Application Priority Data

Feb. 26, 2019   (KR) .................. 10-2019-0022699

(51) Int. Cl.
*H01M 10/04*   (2006.01)
*H01M 50/204*  (2021.01)
(Continued)

(52) U.S. Cl.
CPC ..... *H01M 10/0404* (2013.01); *H01M 50/204* (2021.01); *H01M 50/244* (2021.01); *H01M 50/262* (2021.01)

(58) Field of Classification Search
CPC .......... H01M 10/0404; H01M 50/262; H01M 50/244; H01M 50/204
See application file for complete search history.

(56) References Cited

U.S. PATENT DOCUMENTS

| 2001/0002346 A1 | 5/2001 | Kodaira |
| 2002/0174535 A1 | 11/2002 | Shannon et al. |

(Continued)

FOREIGN PATENT DOCUMENTS

| CN | 108075166 A | * | 5/2018 | ............. G01B 11/24 |
| CN | 207818792 U | | 9/2018 | |

(Continued)

OTHER PUBLICATIONS

Extended European Search Report for European Application No. 207634379.9 dated Jul. 12, 2021.

(Continued)

*Primary Examiner* — Jonathan G Jelsma
(74) *Attorney, Agent, or Firm* — Birch, Stewart, Kolasch & Birch, LLP

(57) ABSTRACT

Discussed is a battery pack manufacturing apparatus and method, and more particularly, a battery pack manufacturing apparatus allowing automatic production and having a minimized manufacturing defect rate. The battery pack manufacturing apparatus manufactures a battery pack having a pack housing and a battery module, and includes a lifting mechanism having a frame configured to mount the pack housing and a moving unit configured to move the frame so (Continued)

that the battery module is inserted into an inner space of the pack housing; and a module support configured to support the battery module.

13 Claims, 10 Drawing Sheets

(51) Int. Cl.
*H01M 50/262* (2021.01)
*H01M 50/244* (2021.01)

(56) References Cited

U.S. PATENT DOCUMENTS

| | | | |
|---|---|---|---|
| 2007/0266553 A1* | 11/2007 | Schlogl | B22D 25/04 29/284 |
| 2015/0221911 A1 | 8/2015 | Kim et al. | |
| 2016/0093855 A1 | 3/2016 | Tononishi | |
| 2018/0229621 A1 | 8/2018 | Roh et al. | |
| 2019/0259987 A1 | 8/2019 | Tate | |
| 2020/0303697 A1 | 9/2020 | Kim et al. | |

FOREIGN PATENT DOCUMENTS

| | | |
|---|---|---|
| JP | 2011-49014 A | 3/2011 |
| JP | 2013-98140 A | 5/2013 |
| JP | 2016-504732 A | 2/2016 |
| JP | 2016-72230 A | 5/2016 |
| JP | 2019-502229 A | 1/2019 |
| JP | 2019-145396 A | 8/2019 |
| JP | 2020-533743 A | 11/2020 |
| KR | 10-1999-004485 A | 1/1999 |
| KR | 10-2001-0051969 A | 6/2001 |
| KR | 10-1289430 B1 | 7/2013 |
| KR | 10-2014-0087780 A | 7/2014 |
| KR | 10-2014-0133140 A | 11/2014 |
| KR | 10-1895352 B1 | 9/2018 |
| WO | WO 2018/223166 A1 | 12/2018 |

OTHER PUBLICATIONS

International Search Report (PCT/ISA/210) issued in PCT/KR2020/001838, dated May 20, 2020.

* cited by examiner

BATTERY PACK MANUFACTURING APPARATUS AND METHOD, AND BATTERY PACK

TECHNICAL FIELD

The present disclosure relates to a battery pack manufacturing apparatus and method, and a battery pack, and more particularly, to a battery pack manufacturing apparatus allowing automatic production and having a minimized manufacturing defect rate.

The present application claims priority to Korean Patent Application No. 10-2019-0022699 filed on Feb. 26, 2019 in the Republic of Korea, the disclosures of which are incorporated herein by reference.

BACKGROUND ART

Currently commercialized secondary batteries include nickel-cadmium batteries, nickel-hydride batteries, nickel-zinc batteries, and lithium secondary batteries. Among these, the lithium secondary batteries are spotlighted since they are freely charged and discharged due to little memory effect compared to nickel-based secondary batteries and have a very low discharge rate and high energy density.

The lithium secondary battery mainly uses a lithium-based oxide and a carbon material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator interposed therebetween, and an exterior, namely a battery pouch exterior, for hermetically accommodating the electrode assembly together with an electrolyte.

Recently, secondary batteries are widely used not only in small devices such as portable electronic devices, but also in medium and large devices such as vehicles and power storage systems. When used in a medium or large device, a large number of secondary batteries are electrically connected to increase capacity and output. In particular, pouch-type secondary batteries are frequently used for the medium or large device since they may be easily stacked.

Meanwhile, as the need for a large-capacity structure has recently increased as well as utilization as an energy storage source, there is an increasing demand for a battery pack that includes a plurality of secondary batteries electrically connected in series and/or in parallel, a module case for accommodates the secondary batteries therein and a battery management system (BMS).

In addition, generally, the battery pack further includes a battery module having a module case and a plurality of secondary batteries accommodated in the module case, and an outer housing made of metal to protect or accommodate the battery module from outer impact. Also, the module case accommodated in the outer housing needs to be fixedly coupled inside the outer housing so that there is no fluctuation therein. This is to prevent an outer impact from causing a secondary internal collision between inner components (the module case, the bus bar, the secondary batteries, etc.) of the battery pack, or to prevent an electrical short circuit from occurring.

Moreover, in a conventional battery pack manufacturing method, a process for inserting and fixing the battery module into the outer housing inner space is performed. However, it is very difficult to perform this process manually because the gap between the battery module and the outer housing inside the outer housing is narrow and the battery module is too heavy for a person to lift and move.

Further, a worker may be easily drop the battery module onto the floor during the process of inserting the battery module into the inner space of the outer housing, and defects such as a shock or a short circuit may easily occur between the battery module and the outer housing. In addition, a lot of time is required for the process of inserting the battery module, which increases the manufacturing cost.

DISCLOSURE

Technical Problem

The present disclosure is designed to solve the problems of the related art, and therefore the present disclosure is directed to providing a battery pack manufacturing apparatus, which may allow automatic production and have a minimized manufacturing defect rate.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack manufacturing apparatus for manufacturing a battery pack having a pack housing and a battery module, the battery pack manufacturing apparatus comprising:

a lifting mechanism having a frame configured to mount the pack housing and a moving unit configured to move the frame so that the battery module is inserted into an inner space of the pack housing; and a module support configured to support the battery module.

Also, the frame may have a perforated portion formed by opening a portion thereof so that the module support passes therethrough.

In addition, the frame may have an erroneous insertion detecting unit configured to detect whether the pack housing is inserted at an exact location.

Moreover, the manufacturing apparatus may further include an attaching and detaching mechanism configured to allow the battery module to be attached and detached.

Also, the attaching and detaching mechanism may include:

a gripping unit having a fixing member configured to be coupled to and separated from the battery module; and a manipulating unit configured to control a location of the gripping unit so that the fixing member is manipulated to be coupled to or separated from the battery module.

Further, the gripping unit may include:

at least two clamps disposed to face each other so that the fixing member is loaded thereto;

at least two mount parts to which the clamps are mounted, the at least two mount parts being configured such that the at least two clamps move close to or away from each other; and a base plate on which the mount parts are loaded, the base plate having a moving bar configured to guide movement of the mount parts.

In addition, the manipulating unit may include:

a lever configured to operate the mount part to move toward the battery module or away from the battery module; and a connection bar having one end connected to the mount part and the other end connected to the lever, the connection bar being configured to transmit a moving force to the mount part according to the manipulation of the lever.

Moreover, the battery pack manufacturing apparatus may further include a feeding mechanism configured to allow the attaching and detaching mechanism to move in a state of fixing the battery module.

Also, the feeding mechanism may include:

a feeding tray on which the attaching and detaching mechanism is loaded, the feeding tray having an opening through which the pack housing passes; and a conveyor configured to supply the feeding tray so that the battery module is located on the module support or to discharge the feeding tray to the outside.

Further, in another aspect of the present disclosure, there is also provided a battery pack manufacturing method for manufacturing a battery pack having a pack housing and a battery module, the battery pack manufacturing method comprising:

a preparing step of loading the pack housing on a lifting mechanism;

a supplying step of supplying a feeding tray so that the battery module is located on a module support;

a loading step of loading the battery module on the module support;

a separating step of separating the battery module loaded on the feeding tray from an attaching and detaching mechanism;

a lifting step of moving the pack housing by the lifting mechanism so that the battery module is inserted into an inner space of the pack housing;

a fastening step of fastening the battery module and the pack housing to each other;

a mounting step of mounting the battery module fastened with the pack housing to the attaching and detaching mechanism; and a discharging step of carrying the feeding tray to a next process in a state where the attaching and detaching mechanism to which the battery module fastened with the pack housing is mounted is loaded thereon.

Also, in another aspect of the present disclosure, there is also provided a battery pack manufactured using the battery pack manufacturing apparatus.

Advantageous Effects

According to an embodiment of the present disclosure, since the battery pack manufacturing apparatus includes a frame configured to mount the pack housing, a lifting mechanism having a moving unit for moving the frame, and a module support configured to support the battery module, the battery module may be easily inserted therein just by simply carrying the pack housing in the vertical direction, thereby enabling an automated process. For this reason, the manufacturing efficiency may be dramatically improved. Moreover, compared to the conventional case where the battery module is manually inserted into the pack housing by a person, it is possible to minimize the occurrence of defects caused by falling of the battery module or the collision between the pack housing and the battery module, which may occur during the inserting process.

Also, according to an embodiment of the present disclosure, since the frame has a perforated portion formed by opening a portion thereof so that the module support may pass therethrough, the battery module may be easily inserted into the pack housing just by moving the lifting mechanism equipped with the pack housing in a state where the battery module is loaded on the module support. Moreover, the present disclosure may reduce the assembly defect rate since the manufacturing process is simple and automated.

In addition, according to another embodiment of the present disclosure, since the frame includes an erroneous insertion detecting unit for detecting whether the middle case of the pack housing is inserted at an exact location, it is possible to prevent a defect from occurring while the battery module is being inserted into the pack housing. Moreover, since erroneous insertion may be immediately determined just by simply loading the pack housing on the lifting mechanism, it is possible to quickly correct the location of the pack housing, thereby increasing the process efficiency.

Moreover, according to another embodiment of the present disclosure, since the manufacturing apparatus further includes an attaching and detaching mechanism configured to allow the battery module to be attached and detached, the battery module may be spaced apart from the upper portion of the module support in the vertical direction. Thus, the battery module may be easily located exactly on the module support before the battery module is loaded on the module support. In addition, after the battery module is inserted into the pack housing, the battery module may be coupled and fixed to the attaching and detaching mechanism so that the module support is separated from the battery module and returned to its original location. Accordingly, the present disclosure may prevent accidents such as falling of the battery module, and it is possible to perform the manufacturing process stably because the battery module is not damaged.

Also, according to another embodiment of the present disclosure, since the gripping unit of the attaching and detaching mechanism includes at least two clamps, at least two mount parts and a base plate so as to be coupled to and detached from the battery module, the gripping unit may securely fix the battery module. In addition, since the attaching and detaching mechanism may slide the gripping unit by the moving bar, the battery module may be easily and stably separated. Accordingly, the battery pack manufacturing apparatus may easily and stably perform the assembling process, thereby minimizing the defect rate of the battery pack.

Further, according to another embodiment of the present disclosure, since the feeding mechanism includes the conveyor configured to supply the feeding tray equipped with the attaching and detaching mechanism or discharge the feeding tray, the battery module, or the pack housing and the battery module, may be carried stably. Moreover, since the feeding tray has an open portion opened with a size through which the pack housing may pass, the process of coupling the pack housing may be initiated just by carrying the feeding tray so that the battery module is located on the module support. Accordingly, it is possible to simplify the manufacturing process, thereby greatly increasing the manufacturing efficiency.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
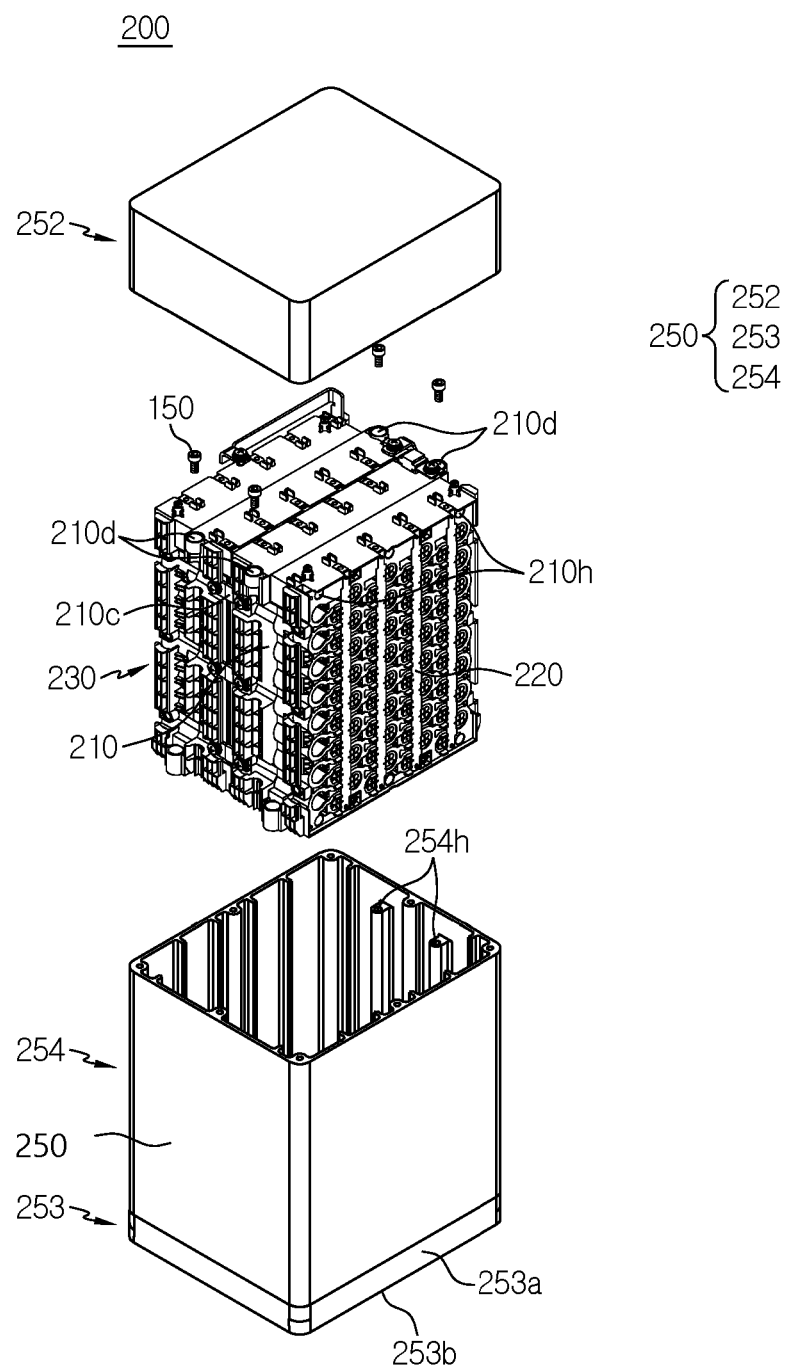
FIG. 1 is an exploded perspective view schematically showing a battery pack according to an embodiment of the present disclosure, where some components are separated.

FIG. 1 is an exploded perspective view schematically showing a battery pack 200 according to an embodiment of the present disclosure, where some components are separated. Also, FIG. 2 is a perspective view for illustrating an example where the battery pack 200 is manufactured using a battery pack manufacturing apparatus 100 according to an embodiment of the present disclosure.

Figure 2:
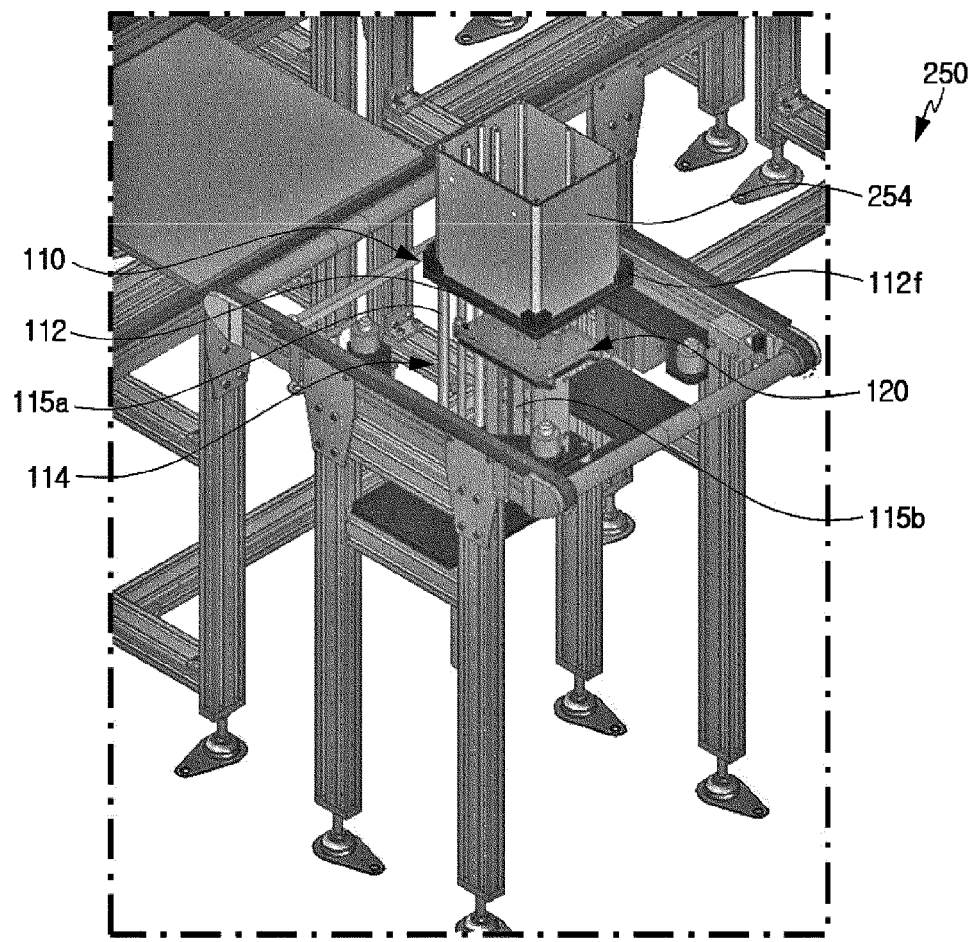
FIG. 2 is a perspective view for illustrating an example where the battery pack is manufactured using a battery pack manufacturing apparatus according to an embodiment of the present disclosure.

Referring to FIGS. 1 and 2, the present disclosure relates to an apparatus for manufacturing a battery pack 200 having a pack housing 250 and a battery module 230.

Here, the battery pack 200 may include a pack housing 250 and a battery module 230. In addition, the battery module 230 may include a plurality of secondary batteries, a bus bar 220, and a module case 210 configured to accommodate the plurality of secondary batteries therein so that the bus bar 220 is loaded thereto. Also, at least two fastening holes 210d configured to be coupled to the pack housing 250 by a bolt 150 may be formed in the module case 210. For example, as shown in FIG. 1, the battery pack 200 may include a pack housing 250 and a battery module 230 accommodated inside the pack housing 250. At this time, the module case 210 provided to the battery module 230 may have four fastening holes 210d configured to fasten the pack housing 250 by the bolt 150.

Further, the pack housing 250 may include a top cap 252, a middle case 254, and a bottom support 253. Specifically, the middle case 254 may be coupled to a lower portion of the top cap 252, and the bottom support 253 may be coupled to a lower portion of the middle case 254. More specifically, the top cap 252 may have an upper wall and a sidewall to cover an upper portion of the module case 210 accommodated inside the pack housing 250. Also, the middle case 254 may have a rectangular tubular shape opened in the vertical direction. Further, the bottom support 253 may have a sidewall 253a and a lower wall 253b in the form of a box with an open top. More specifically, the fastening hole 210d formed in the module case 210 may be configured to be coupled to a fastening groove 254h provided at an inner surface of the middle case 254 by the bolt 150.

For example, as shown in FIG. 1, four fastening grooves 254h positioned at locations corresponding to the fastening holes 210d of the module case 210 may be provided at the inner surface of the middle case 254. In addition, the battery pack 200 may include four fastening bolts 150 for fastening the fastening hole 210d of the module case 210 and the middle case 254 to each other.

Meanwhile, the battery pack manufacturing apparatus 100 according to an embodiment of the present disclosure may be configured to perform a process of inserting the battery module 230 into the middle case 254. In addition, the battery pack manufacturing apparatus 100 may be configured to perform a process of coupling the battery module 230 and the pack housing 250 by the bolt 150.

Figure 3:
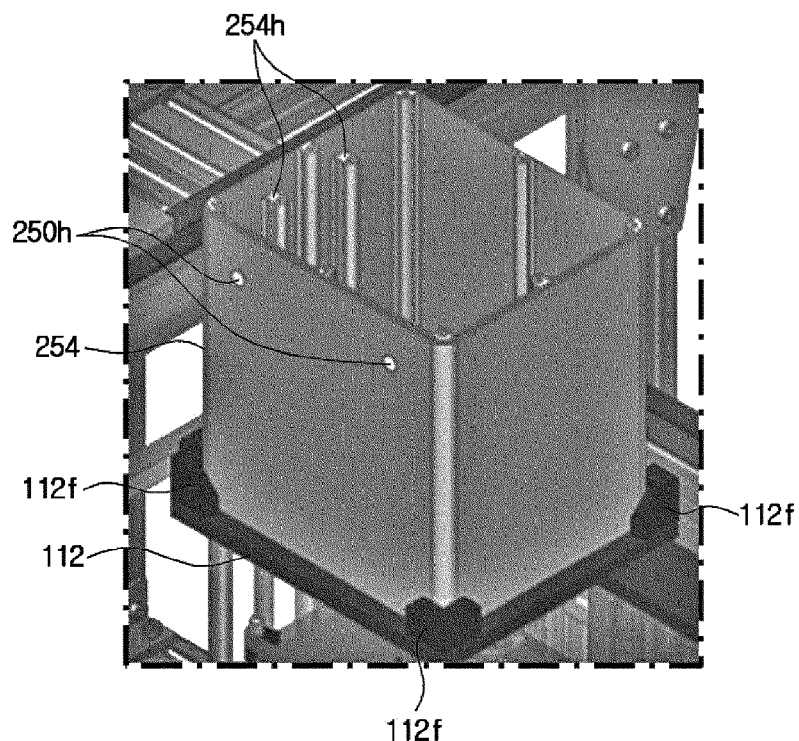
FIG. 3 is a partially enlarged perspective view showing a portion of the battery pack manufacturing apparatus of FIG. 2.

FIG. 3 is a partially enlarged perspective view showing a portion of the battery pack manufacturing apparatus of FIG. 2.

Referring to FIG. 3 along with FIGS. 1 and 2, the battery pack manufacturing apparatus 100 may include a lifting mechanism 110 and a module support 120. Specifically, the lifting mechanism 110 may include a frame 112 and a moving unit 114. More specifically, the frame 112 may be configured so that the pack housing 250 is mounted to an upper portion thereof. The frame 112 may be a rectangular frame 112 with an open center. That is, the rectangular frame 112 may be configured in a way that four bars are connected to be perpendicular to each other in a horizontal direction.

In addition, the frame 112 may be configured such that a lower end of the middle case 254 is placed on an upper surface thereof. Also, the frame 112 may have a fixing portion 112f so that the lower end of the middle case 254 may be fixed thereto. For example, as shown in FIG. 3, four fixing portions 112f may be provided at the upper surface of the frame 112. The four fixing portions 112f may have a structure corresponding to a part of an outer circumference of the lower end of the middle case 254. That is, the four fixing portions 112f may be configured to be in close contact with four corner portions formed on the outer lower circumference of the lower end of the middle case 254. The fixing portion 112f may have an L shape extending perpendicularly in the horizontal direction.

In addition, the moving unit 114 may be configured such that the frame 112 is movable at least in the vertical direction. The moving unit 114 may include a lifting means (not shown) for moving the frame 112 so that the battery module 230 is inserted into the inner space of the pack housing 250. The lifting means may have an operator. The operator may be a means for accurately moving the frame 112. The operator may be a servo motor, a step motor, a hydraulic motor, a hydraulic cylinder, or a pneumatic cylinder. For example, as shown in FIG. 2, the lifting means may be the pneumatic cylinder. At this time, a top end of the pneumatic cylinder 115a may be configured to be connected to a bottom end of the frame 112.

Further, the module support 120 may have a wide plate-shaped body to support the battery module 230. In addition, the module support 120 may have an operator. The operator may be a means of accurately moving the module support 120. The operator may be a servo motor, a step motor, a hydraulic motor, a hydraulic cylinder, or a pneumatic cylinder. For example, as shown in FIG. 2, the lifting means may be the pneumatic cylinder. At this time, a top end of the cylinder 115b of the pneumatic cylinder may be configured to be connected to a bottom end of the module support 120.

Thus, according to this configuration of the present disclosure, since the battery pack manufacturing apparatus 100 includes a frame 112 configured to mount the pack housing 250, a lifting mechanism 110 having a moving unit 114 for moving the frame 112, and a module support 120 configured to support the battery module 230, the battery module 230 may be easily inserted therein just by simply carrying the pack housing 250 in the vertical direction, thereby enabling an automated process. For this reason, the manufacturing efficiency may be dramatically improved. Moreover, compared to the conventional case where the battery module 230 is manually inserted into the pack housing 250 by a person, it is possible to minimize the occurrence of defects caused by falling of the battery module 230 or the collision between the pack housing 250 and the battery module 230, which may occur during the inserting process.

Figure 4:
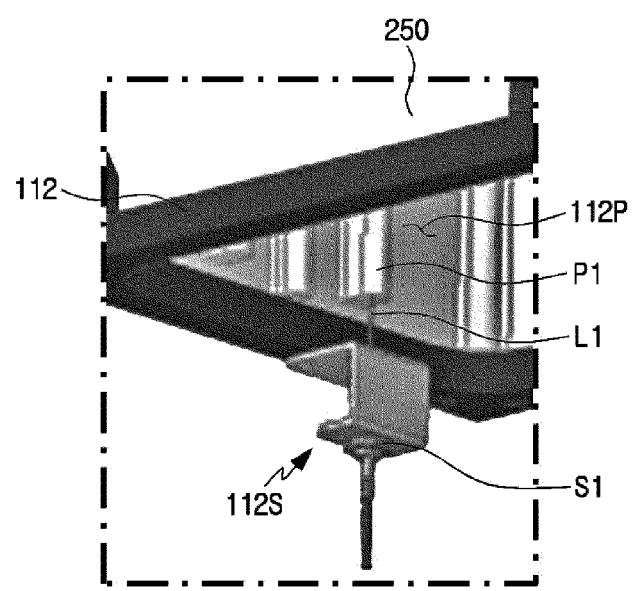
FIG. 4 is a perspective view for illustrating another example where the battery pack is manufactured using the battery pack manufacturing apparatus according to an embodiment of the present disclosure.

FIG. 4 is a perspective view for illustrating another example where the battery pack is manufactured using the battery pack manufacturing apparatus according to an embodiment of the present disclosure. Also, FIG. 5 is a perspective view for illustrating still another example where the battery pack is manufactured using the battery pack manufacturing apparatus according to an embodiment of the present disclosure.

Figure 5:
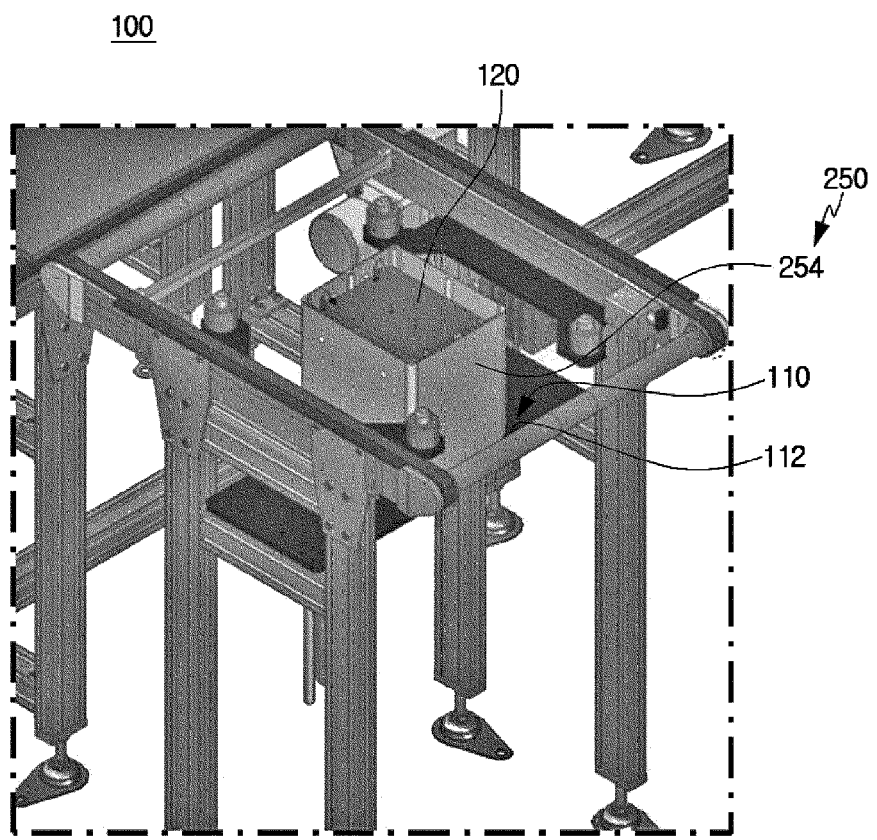
FIG. 5 is a perspective view for illustrating still another example where the battery pack is manufactured using the battery pack manufacturing apparatus according to an embodiment of the present disclosure.

Referring FIGS. 4 and 5 along with FIG. 2, the frame 112 may have a perforated portion 112P formed by opening a portion thereof so that the module support 120 may pass therethrough. That is, the module support 120 may have a size capable of passing through the perforated portion 112P of the frame 112. Thus, the battery module 230 loaded on the module support 120 may be inserted into the pack housing 250 by moving the pack housing 250 loaded on the frame 112.

The module support 120 may be configured to pass through the perforated portion 112P. For example, as shown in FIG. 5, the frame 112 may be moved downward by the moving unit 114 so that the module support 120 passes through the perforated portion 112P from bottom to top. Conversely, as shown in FIG. 2, the frame 112 may be moved upward by the moving unit 114 so that the module support 120 passes through the perforated portion 112P from top to bottom.

Thus, according to this configuration of the present disclosure, since the frame 112 has a perforated portion 112P formed by opening a portion thereof so that the module support 120 may pass therethrough, the battery module 230 may be easily inserted into the pack housing 250 just by moving the lifting mechanism 110 equipped with the pack housing 250 in a state where the battery module 230 is loaded on the module support 120. Moreover, the present disclosure may reduce the assembly defect rate since the manufacturing process is simple and automated.

In addition, the frame 112 may include an erroneous insertion detecting unit 112S for detecting whether the middle case 254 of the pack housing 250 is inserted at an exact location. The erroneous insertion detecting unit 112S may be fixed to a bottom end of the frame 112. The erroneous insertion detecting unit 112S may include a laser sensor S1 that emits laser L1. Further, a protrusion P1 protruding inward from the inner surface of the pack housing 250 may be formed inside the pack housing 250 so that the erroneous insertion detecting unit 112S may determine whether the pack housing 250 is erroneously inserted. For example, as shown in FIG. 4, the erroneous insertion detecting unit 112S may include a laser sensor S1. The erroneous insertion detecting unit 112S may detect by using the laser sensor S1 whether the protrusion P1 formed on the inner surface of the pack housing 250 is located at the exact location, thereby determining whether the pack housing 250 is loaded at an exact location.

Thus, according to this configuration of the present disclosure, since the frame 112 includes an erroneous insertion detecting unit 112S for detecting whether the middle case 254 of the pack housing 250 is inserted at an exact location, it is possible to prevent a defect from occurring while the battery module 230 is being inserted into the pack housing 250. Moreover, since erroneous insertion may be immediately determined just by simply loading the pack housing 250 on the lifting mechanism 110, it is possible to quickly correct the location of the pack housing 250, thereby increasing the process efficiency.

Figure 6:
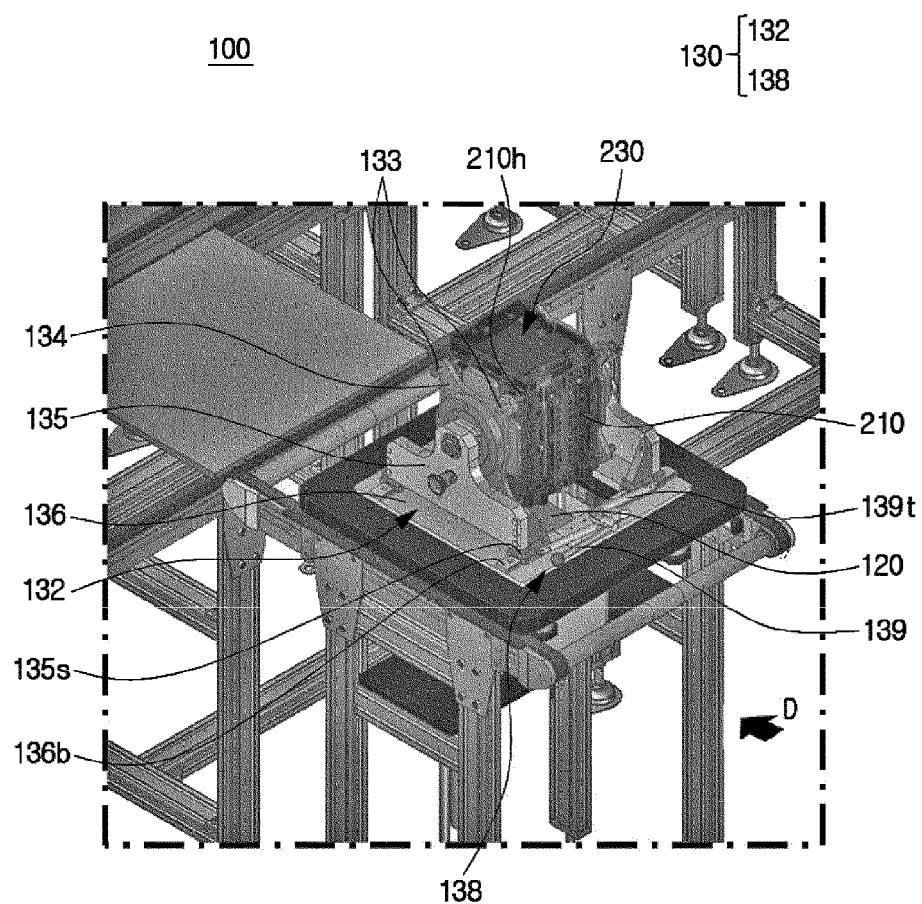
FIG. 6 is a perspective view for illustrating still another example where the battery pack is manufactured using the battery pack manufacturing apparatus according to an embodiment of the present disclosure.

FIG. 6 is a perspective view for illustrating still another example where the battery pack is manufactured using the battery pack manufacturing apparatus according to an embodiment of the present disclosure.

Referring to FIG. 6, the manufacturing apparatus 100 may further include an attaching and detaching mechanism 130 configured to allow the battery module 230 to be attached and detached. The attaching and detaching mechanism 130 may be coupled to a portion of the battery module 230 to be spaced apart from the module support 120 in the vertical direction.

Specifically, the attaching and detaching mechanism 130 may include a gripping unit 132 and a manipulating unit 138. The gripping unit 132 may include a fixing member 133 configured to be coupled to and detached from the battery module 230. The manipulating unit 138 may control the location of the gripping unit 132 so that the fixing member 133 is coupled to or separated from the battery module 230. When the battery module 230 is loaded on the module support 120, the attaching and detaching mechanism 130 may be separated from the battery module 230. Conversely, in a state where the attaching and detaching mechanism 130 is coupled to the battery module 230, the module support 120 may be moved downward from the battery module 230 to be spaced apart therefrom.

Thus, according to this configuration of the present disclosure, since the manufacturing apparatus 100 further includes an attaching and detaching mechanism 130 configured to allow the battery module 230 to be attached and detached, the battery module 230 may be spaced apart from the upper portion of the module support 120 in the vertical direction. Thus, the battery module 230 may be easily located exactly on the module support 120 before the battery module 230 is loaded on the module support 120. In addition, after the battery module 230 is inserted into the pack housing 250, the battery module 230 may be coupled and fixed to the attaching and detaching mechanism 130 so that the module support 120 is separated from the battery module 230 and returned to its original location. Accordingly, the present disclosure may prevent accidents such as falling of the battery module 230, and it is possible to perform the manufacturing process stably because the battery module 230 is not damaged.

Figure 7:
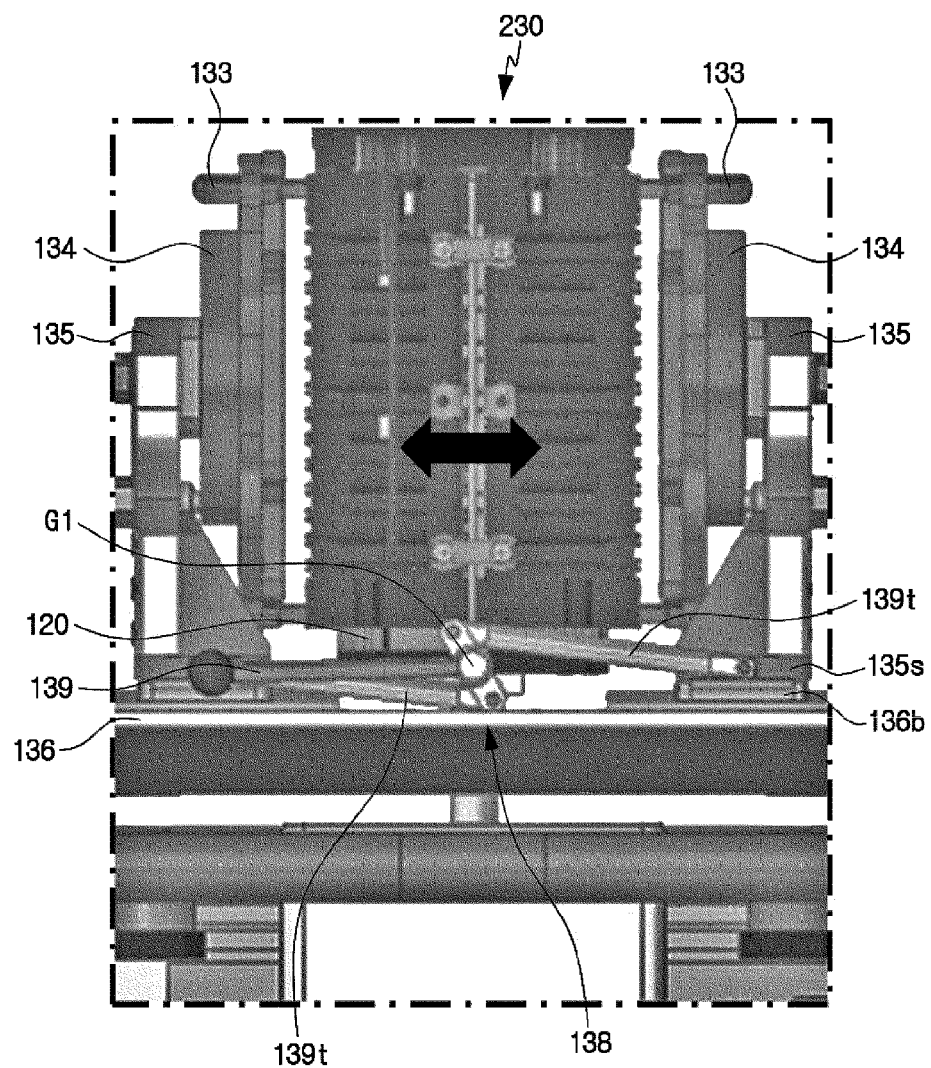
FIG. 7 is a partial front view schematically showing a portion of the battery pack manufacturing apparatus according to an embodiment of the present disclosure.

FIG. 7 is a partial front view schematically showing a portion of the battery pack manufacturing apparatus according to an embodiment of the present disclosure.

Referring to FIG. 7 along with FIGS. 1 and 6, the gripping unit 132 includes at least two clamps 134, at least two mount parts 135 to which the clamps 134 are mounted, and a base plate 136 on which the mount parts 135 are loaded. Specifically, the at least two clamps 134 may be disposed to face each other so that the fixing member 133 is loaded thereto. In addition, the battery module 230 may be located between the at least two clamps 134. A plurality of fixing members 133 may be provided to each of the at least two clamps 134. Here, the fixing member 133 may have a circular bar shape elongated in one direction.

For example, as shown in FIGS. 6 and 7, in each of the at least two clamps 134, four fixing members 133 may be provided to be inserted through the clamp 134 inward toward the battery module 230 and fixed thereto.

In addition, the fixing member 133 may be configured to be inserted into a perforated groove 210*h* (FIG. 1) provided to the battery module 230. The perforated groove 210*h* may be formed to be indented inward toward the plurality of secondary batteries at each of left and right outer walls 210*c* of the module case 210 of the battery module 230. For example, based on the direction D of FIG. 6, four perforated grooves 210*h* may be provided at the left outer wall 210*c* of the module case 210, and four perforated grooves 210*h* may be provided to the right outer wall 210*c* of the module case 210.

Meanwhile, the terms indicating directions such as front, rear, left, right, upper and lower directions used in the specification may be changed depending on a location of an observer or a placed form of a target. However, in this specification, for convenience of description, the front, rear, left, right, upper and lower directions will be classified based on when being viewed in the direction D.

In addition, in each of the at least two mount parts 135, the clamp 134 may be coupled at one side toward the battery module 230 (in an inner direction). For example, the mount part 135 may be coupled to the clamp 134 by a bolt. For example, as shown in FIG. 6, the manufacturing apparatus 100 may include two mount parts 135 to which the clamps 134 are coupled, respectively.

Moreover, the at least two mount parts 135 may be configured such that the at least two clamps 134 mounted thereto are moved closer to each other or farther from each other. The at least two mount parts 135 may be configured to be movable in both directions on the base plate 136. The base plate 136 may have a moving bar 136*b* for guiding the movement of the mount part 135. The moving bar 136*b* may have an elongated shape such that the mount parts 135 are movable in a direction along which the at least two clamps 134 move closer to or farther from each other. A sliding portion 135*s* having an indented structure may be provided to a lower portion of the mount part 135 to slide along the moving bar 136*b* in both directions. The sliding portion 135*s* may have an indented structure in a shape corresponding to a portion of the moving bar 136*b* so that the upper portion of the moving bar 136*b* is inserted therein.

Thus, according to this configuration of the present disclosure, since the gripping unit 132 of the attaching and detaching mechanism 130 includes at least two clamps 134, at least two mount parts 135 and a base plate 136 so as to be coupled to and detached from the battery module 230, the gripping unit 132 may securely fix the battery module 230. In addition, since the attaching and detaching mechanism 130 may slide the gripping unit 132 by the moving bar 136*b*, the battery module 230 may be easily and stably separated. Accordingly, the battery pack manufacturing apparatus 100 may easily and stably perform the assembling process, thereby minimizing the defect rate of the battery pack 200.

Figure 8:
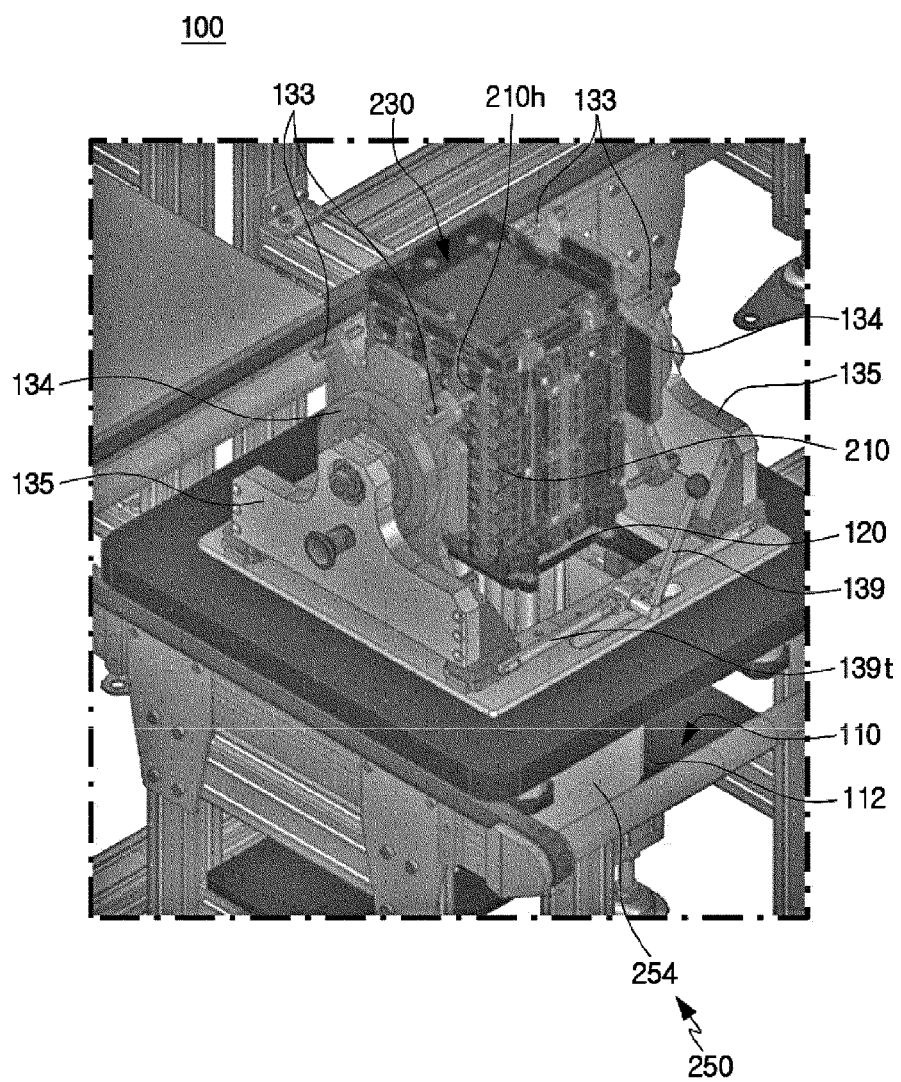
FIG. 8 is a perspective view for illustrating still another example where the battery pack is manufactured using the battery pack manufacturing apparatus according to an embodiment of the present disclosure.

FIG. 8 is a perspective view for illustrating still another example where the battery pack is manufactured using the battery pack manufacturing apparatus according to an embodiment of the present disclosure.

Referring to FIG. 8 along with FIGS. 6 and 7, the manipulating unit 138 may include a lever 139 configured to manipulate the mount part 135 to move toward the battery module 230 or to move away from the battery module 230. In addition, a connection bar 139*t* may have one end connected to a lower portion of the mount part 135 and the other end connected to the lever 139. The connection bar 139*t* may be configured to transmit a moving force to the mount part 135 according to the manipulation of the lever 139.

In addition, the connection bar 139*t* may be coupled to the lever 139 by a hinge G1. When looking in the D direction, according to the rotation of the lever 139, the hinged connection bar 139*t* may be moved in the left or right direction. For example, the two connection bars 139*t* may be coupled to the lever 139 by the hinge G1. The connection bar 139*t* may have one end connected to the mount part 135 and the other end connected to the lever 139. If the lever 139 is rotated to the left, the two connection bars 139*t* may be moved closer to each other. Conversely, if the lever 139 is rotated to the right, the two connection bars 139*t* may be moved away from each other.

For example, as shown in FIG. 7, by manipulating the lever 139, the two mount parts 135 may be moved toward the battery module 230 (in an inner direction) so that the battery module 230 is coupled to the clamp 134. At this time, the lever 139 may be rotated to the left. The fixing member 133 of the clamp 134 may be inserted into the perforated groove 210*h* of the module case 210.

Conversely, as shown in FIG. 8, by operating the lever 139, the two mount parts 135 may be moved away from the battery module 230 (in an outer direction) so that the battery module 230 is separated from the clamp 134. At this time, the lever 139 may be rotated to the right. In addition, the fixing member 133 of the clamp 134 may be separated from the perforated groove 210*h* of the module case 210.

Figure 9:
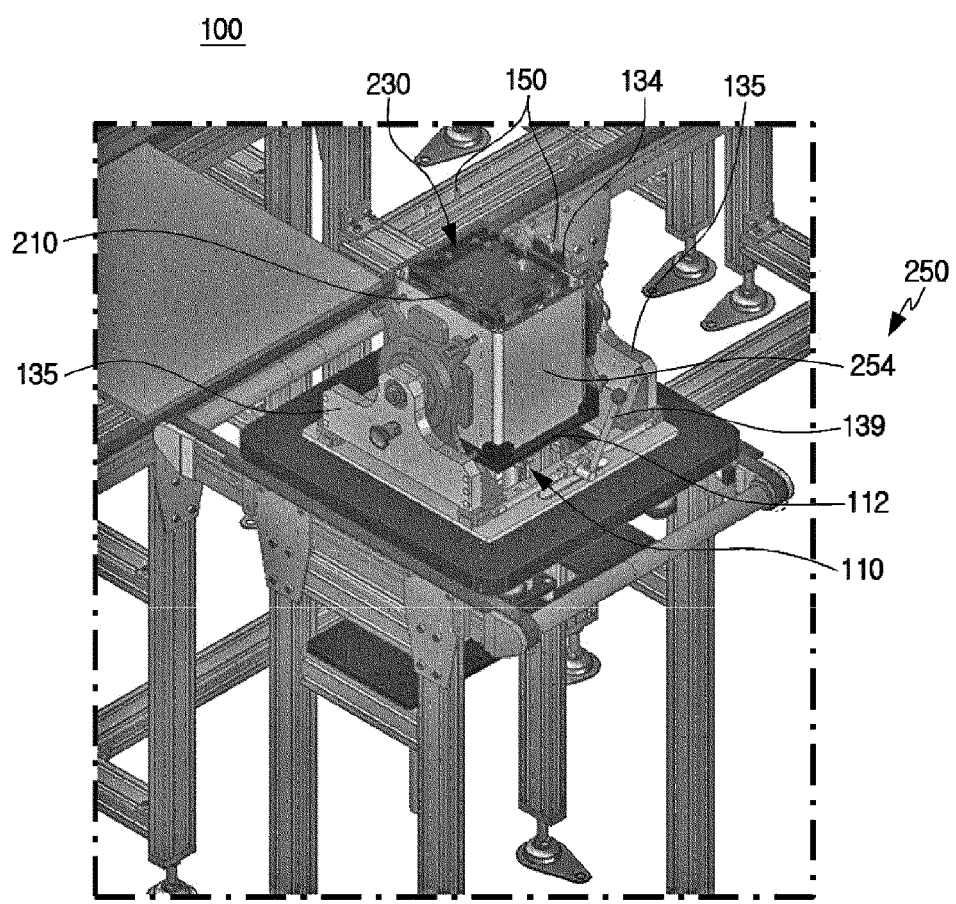
FIG. 9 is a perspective view for illustrating still another example where the battery pack is manufactured using the battery pack manufacturing apparatus according to an embodiment of the present disclosure.

FIG. 9 is a perspective view for illustrating still another example where the battery pack is manufactured using the battery pack manufacturing apparatus according to an embodiment of the present disclosure.

Referring to FIG. 9 along with FIGS. 1 and 8, if the battery module 230 is separated from the attaching and detaching mechanism 130, the lifting mechanism 110 may move the pack housing 250 upward so that the battery module 230 is inserted into the pack housing 250. At this time, the module support 120 may be located inside the perforated portion 112P (FIG. 4) of the frame 112 of the lifting mechanism 110.

For example, as shown in FIG. 9, the lever 139 may be rotated to the right to move the two clamps 134 away from the battery module 230. At this time, the lifting mechanism 110 may move the frame 112 upward so that the module support 120 is located inside the perforated portion 112P of the frame 112. Also, the fastening groove 254h (FIG. 1) provided to the inner surface of the middle case 254 and the fastening hole 210d of the module case 210 may be positioned to communicate with each other. The manufacturing apparatus 100 may be equipped with a separate bolting machine (an electric driver, not shown) so that the fastening hole 210d (FIG. 1) of the module case 210 and the fastening groove 254h of the middle case 254 are coupled to each other by the bolt 150.

Figure 10:
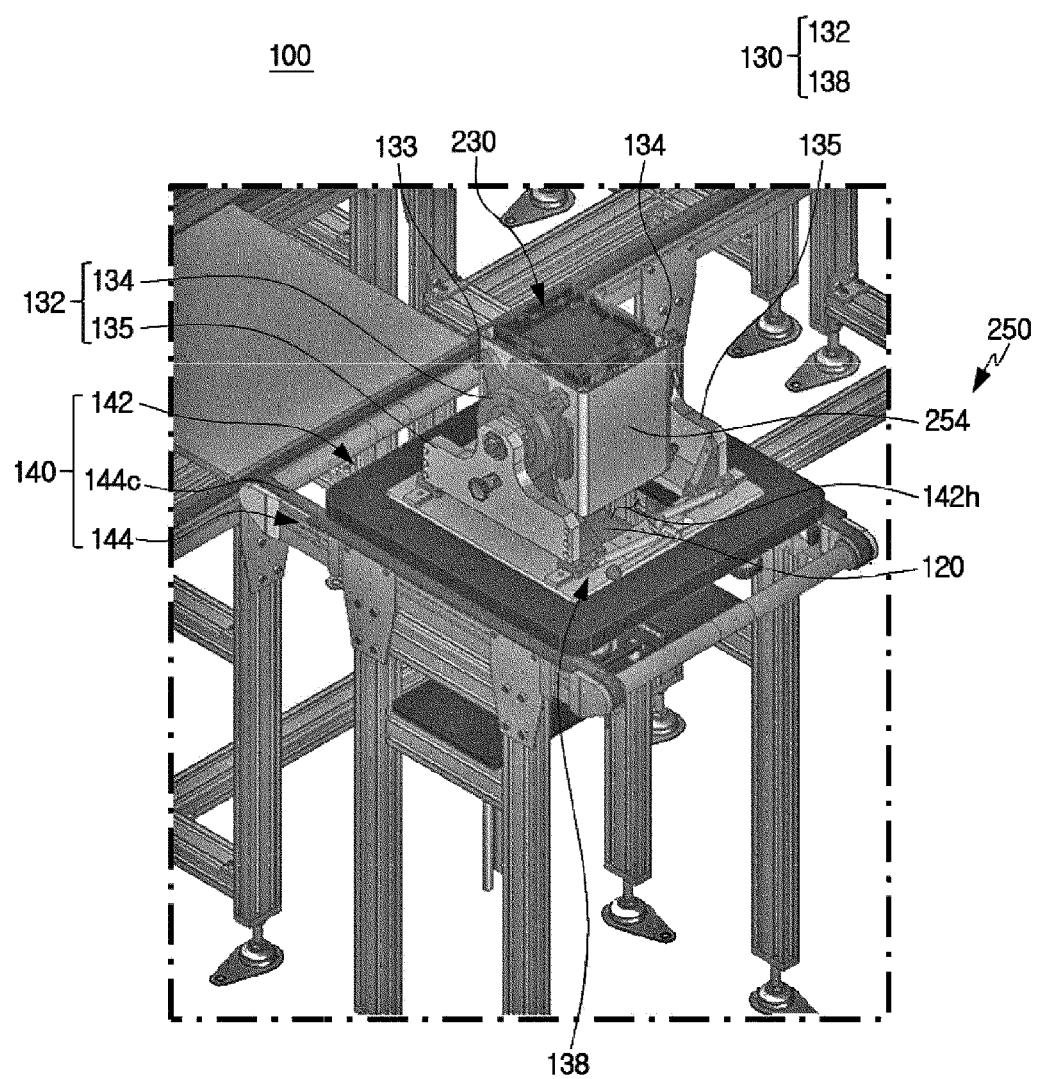
FIG. 10 is a perspective view for illustrating still another example where the battery pack is manufactured using the battery pack manufacturing apparatus according to an embodiment of the present disclosure.

FIG. 10 is a perspective view for illustrating still another example where the battery pack is manufactured using the battery pack manufacturing apparatus according to an embodiment of the present disclosure.

Referring to FIG. 10 along with FIGS. 3 and 9, an opening 250h may be formed in the pack housing 250 so that the fixing member 133 of the clamp 134 is inserted therethrough. For example, as shown in FIG. 3, two openings 250h through which the fixing member 133 is inserted may be formed at the left outer wall 210c of the pack housing 250. In addition, two openings 250h through which the fixing member 133 are inserted may be formed at the right outer wall 210c of the pack housing 250.

Moreover, by the lever 139 of the manipulating unit 138 (FIG. 6), the mounting parts 135 may be moved again toward the battery module 230 (in an inner direction) so that the fixing member 133 provided to each of the two clamps 134 located on both sides of the battery module 230 is inserted through the opening 250h of the pack housing 250. At this time, the fixing member 133 may also be inserted into and fixed to the perforated groove 210h of the module case 210 at the same time as being inserted through the opening 250h.

Figure 11:
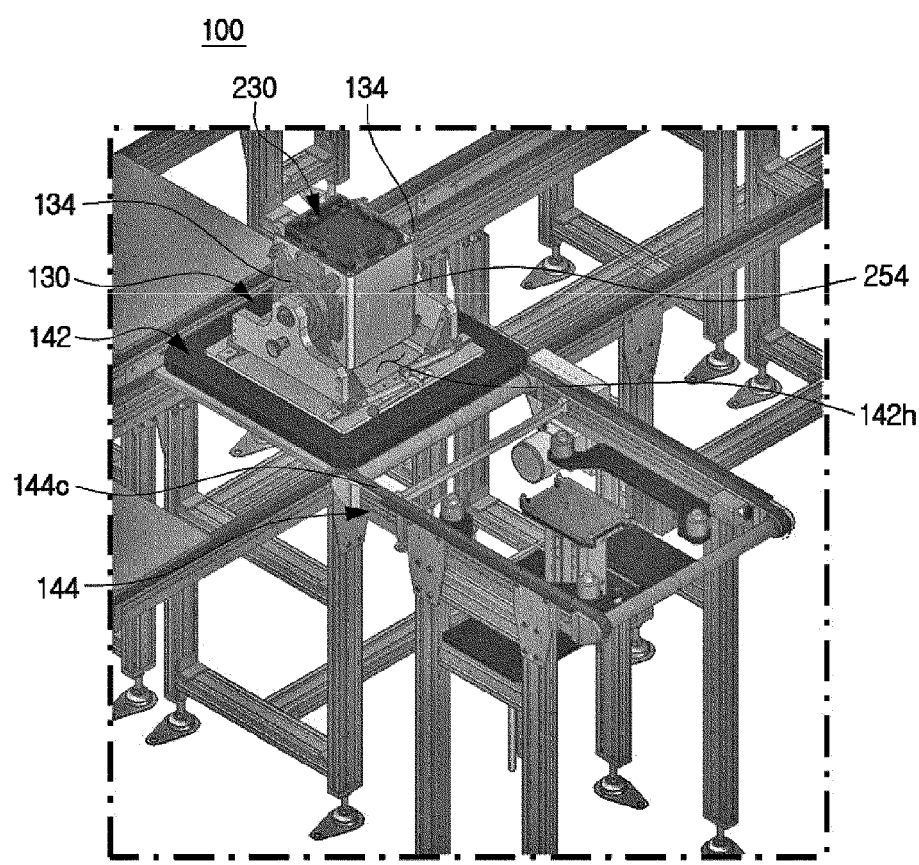
FIG. 11 is a perspective view for illustrating still another example where the battery pack is manufactured using the battery pack manufacturing apparatus according to an embodiment of the present disclosure.

FIG. 11 is a perspective view for illustrating still another example where the battery pack is manufactured using the battery pack manufacturing apparatus according to an embodiment of the present disclosure.

Referring to FIG. 11 along with FIG. 10, the battery pack manufacturing apparatus 100 may further include a feeding mechanism 140 configured to allow the attaching and detaching mechanism 130 to be movable in a state of fixing the battery module 230. The feeding mechanism 140 may include a feeding tray 142 and a conveyor 144 for carrying the feeding tray 142. The feeding tray 142 may be configured so that the attaching and detaching mechanism 130 is loaded thereon.

In addition, an open portion 142h may be formed in the feeding tray 142 so that the pack housing 250 may move therethrough. The attaching and detaching mechanism 130 may be located around the open portion 142h of the feeding tray 142. For example, as shown in FIG. 9, the feeding mechanism 140 may have a feeding tray 142 in the form of a rectangular frame. The open portion 142h may be formed at the center of the feeding tray 142 so that the pack housing 250 may move therethrough. In addition, the attaching and detaching mechanism 130 may be loaded around the open portion 142h of the feeding tray 142.

In addition, the conveyor 144 may be configured to supply the feeding tray 142 so that the battery module 230 is located on the module support 120. Conversely, the conveyor 144 may be configured to discharge the feeding tray 142 to the outside.

Moreover, the conveyor 144 may be a belt conveyor or a chain conveyor. For example, as shown in FIG. 10, the feeding mechanism 140 may include a chain conveyor 144 configured to supply the feeding tray 142 so that the battery module 230 is located on the module support 120.

In addition, as shown in FIG. 10, a chain 144c of the chain conveyor 144 may be configured to contact lower surfaces of both right and left ends of the feeding tray 142. The feeding tray 142 may be configured to move as the chain 144c moves. For example, as shown in FIG. 11, the conveyor 144 may carry the feeding tray 142 equipped with the attaching and detaching mechanism 130 coupled to the pack housing 250 and the battery module 230 to be discharged to the outside.

Thus, according to this configuration of the present disclosure, since the feeding mechanism 140 includes the conveyor 144 configured to supply the feeding tray 142 equipped with the attaching and detaching mechanism 130 or discharge the feeding tray 142, the battery module 230, or the pack housing 250 and the battery module 230, may be carried stably. Moreover, since the feeding tray 142 has an open portion 142h opened with a size through which the pack housing 250 may pass, the process of coupling the pack housing 250 may be initiated just by carrying the feeding tray 142 so that the battery module 230 is located on the module support 120. Accordingly, it is possible to simplify the manufacturing process, thereby greatly increasing the manufacturing efficiency.

Meanwhile, referring to FIGS. 2 and 5 to 11 again, there may be provided a method of manufacturing the battery pack 200 having the pack housing 250 and the battery module 230 according to an embodiment of the present disclosure.

The battery pack manufacturing method for manufacturing the battery pack 200 according to an embodiment of the present disclosure may include a preparing step, a supplying step, a loading step, a separating step, a lifting step, a fastening step, a mounting step, and a discharging step. Specifically, in the preparing step, as shown in FIG. 2, the pack housing 250 may be loaded on the frame 112 provided to the lifting mechanism 110. At this time, the lower end of the pack housing 250 may be temporarily fixed by the fixing portion 112f coupled to the frame 112. As shown in FIG. 4, the erroneous insertion detecting unit 112S may determine whether the pack housing 250 is exactly located. In addition, as shown in FIG. 5, the lifting mechanism 110 may move the frame 112 downward so that the module support 120 is inserted into the pack housing 250.

Moreover, in the supplying step, the feeding tray 142 may be supplied and carried by the conveyor 144 so that the battery module 230 is located on the module support 120. At this time, the attaching and detaching mechanism 130 may be loaded on the feeding tray 142. In addition, the attaching and detaching mechanism 130 may be configured to be coupled to and detached from the battery module 230 by means of the fixing member 133. For example, as shown in FIG. 6, the battery module 230 may be coupled to the attaching and detaching mechanism 130 by the fixing member 133.

Further, in the loading step, as shown in FIG. 7, the module support 120 may be moved upward so that the battery module 230 is loaded on the module support 120. At this time, the module support 120 may be moved upward by the operator.

In addition, in the separating step, the battery module 230 loaded on the feeding tray 142 may be separated from the attaching and detaching mechanism 130. At this time, the gripping unit 132 of the attaching and detaching mechanism 130 may be separated from the battery module 230 by the manipulating unit 138. In the separating step, the battery module 230 may be in a state of being loaded on the module support 120. As in FIG. 8, the two mount parts 135 may be moved away from each other by manipulating the lever 139. By doing so, the fixing member 133 may be separated from the perforated groove 210h of the module case 210.

Moreover, in the lifting step, the lifting mechanism 110 may move the pack housing 250 so that the battery module 230 is inserted into the inner space of the pack housing 250. As in FIG. 9, the lifting mechanism 110 may move the frame 112 upward so that the module support 120 is located inside the perforated portion 112P of the frame 112.

In addition, in the fastening step, the battery module 230 and the pack housing 250 may be fastened to each other in a state where the battery module 230 is inserted into the pack housing 250. As shown in FIG. 9, in a state where the fastening groove 254h (FIG. 1) provided to the inner surface of the middle case 254 of the pack housing 250 and the fastening hole 210d (FIG. 1) of the module case 210 are positioned to communicate with each other, the fastening hole 210d of the module case 210 and the fastening groove 254h of the middle case 254 may be coupled to each other using four bolts 150.

Further, in the mounting step, the battery module 230 to which the pack housing 250 is fastened may be mounted to the attaching and detaching mechanism 130 again. For example, as in FIG. 10, by the manipulating unit 138, the mount part 135 may be moved again toward the battery module 230 so that the fixing member 133 provided to each of the two clamps 134 located at both sides of the battery module 230 is inserted through the opening 250h (FIG. 3) of the pack housing 250. At this time, the fixing member 133 may also be inserted into the perforated groove 210h (FIG. 1) of the module case 210 at the same time as being inserted through the opening 250h.

In addition, in the discharging step, the feeding tray 142 equipped with the attaching and detaching mechanism 130 to which the battery module 230 fastened with the pack housing 250 is mounted may be carried to the next process. For example, as in FIG. 11, the chain conveyor 144 may carry the feeding tray 142 equipped with the pack housing 250 and the battery module 230 to be discharged to the outside.

Meanwhile, the battery pack 200 according to an embodiment of the present disclosure is manufactured using the battery pack manufacturing apparatus 100. In addition, the battery pack 200 may further include various devices (not shown) for controlling charging and discharging of the plurality of secondary batteries, for example as a battery management system (BMS), a current sensor, and a fuse.

Meanwhile, even though the terms indicating directions such as upper, lower, left, right, front and rear directions are used in the specification, it is obvious to those skilled in the art that these merely represent relative locations for convenience in explanation and may vary based on a location of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

| | |
|---|---|
| 100: battery pack manufacturing apparatus | 110: lifting mechanism |
| 112: frame | 114: moving unit |
| 120: module support | 112P: perforated portion |
| 112S: erroneous insertion detecting unit | 130: attaching and detaching mechanism |
| 132: gripping unit | 138: manipulating unit |
| 133: fixing member | 134: clamp |
| 135: mount part | 136: base plate |
| 136b: moving bar | 135s: sliding portion |
| 139: lever | 139t: connection bar |
| 140: feeding mechanism | 142: feeding tray |
| 144: conveyor | |
| 200: battery pack | 230: battery module |
| 210: module case | |
| 210c: outer wall | 250: pack housing |
| 254: middle case | |

INDUSTRIAL APPLICABILITY

The present disclosure relates to a battery pack manufacturing apparatus and method, and a battery pack. In addition, the present disclosure is applicable to a manufacturing field for manufacturing a battery pack, and an industry related to vehicles including at least one battery pack.

What is claimed is:

1. A battery pack manufacturing apparatus for manufacturing a battery pack having a pack housing and a battery module, the battery pack manufacturing apparatus comprising:
   a lifting mechanism having a frame configured to mount the pack housing and a moving unit configured to move the frame so that the battery module is inserted into an inner space of the pack housing; and
   a module support configured to support the battery module,
   wherein the frame has a perforated portion formed by opening a portion at a middle of the frame so that the module support passes through the middle of the frame when the battery module is being inserted into the inner space of the pack housing.

2. The battery pack manufacturing apparatus according to claim 1, wherein the frame has an erroneous insertion detecting unit configured to detect whether the pack housing is inserted at an exact location for the battery module to be inserted into the inner space of the pack housing.

3. The battery pack manufacturing apparatus according to claim 1, further comprising:
   an attaching and detaching mechanism configured to allow the battery module to be attached and detached thereto,
   wherein the attaching and detaching mechanism includes:
   a gripping unit having a fixing member configured to be coupled to and separated from the battery module; and a manipulating unit configured to control a location of the gripping unit so that the fixing member is manipulated to be coupled to or separated from the battery module.

4. The battery pack manufacturing apparatus according to claim 3, wherein the gripping unit includes:
  at least two clamps disposed to face each other so that the fixing member is loaded thereto;
  at least two mount parts to which the at least two clamps are mounted, respectively, the at least two mount parts being configured such that the at least two clamps move close to or away from each other; and
  a base plate on which the at least two mount parts are loaded, the base plate having a moving bar configured to guide movement of the at least two mount parts.

5. The battery pack manufacturing apparatus according to claim 4, wherein, for each of the at least two mount parts, the manipulating unit includes:
  a lever configured to operate the mount part to move toward the battery module or away from the battery module; and
  a connection bar having one end connected to the mount part and the other end connected to the lever, the connection bar being configured to transmit a moving force to the mount part according to the manipulation of the lever.

6. The battery pack manufacturing apparatus according to claim 3, further comprising:
  a feeding mechanism configured to allow the attaching and detaching mechanism to move in a state of fixing the battery module.

7. The battery pack manufacturing apparatus according to claim 6, wherein the feeding mechanism includes:
  a feeding tray on which the attaching and detaching mechanism is loaded, the feeding tray having an opening through which the pack housing passes; and
  a conveyor configured to supply the feeding tray so that the battery module is located on the module support or to discharge the feeding tray to the outside.

8. A battery pack, manufactured using the battery pack manufacturing apparatus according to claim 1.

9. The battery pack, manufactured using the battery pack manufacturing apparatus according to claim 8, the battery pack comprising:
  the pack housing; and
  the battery module,
  wherein the pack housing includes:
    a middle case having a tubular shape opened in a vertical direction;
    at top cap coupled to a top portion of the middle case; and
    a bottom support coupled to a bottom portion of the middle case.

10. The battery pack, manufactured using the battery pack manufacturing apparatus according to claim 9, wherein the middle case further includes an opening configured to accommodate a fixing member of the attaching and detaching mechanism of the battery pack manufacturing apparatus.

11. The battery pack manufacturing apparatus according to claim 1, wherein the frame moves vertically relative to the module support, so that the module support passes from a top to a bottom of the perforated portion or from the bottom to the top of the perforated portion.

12. A battery pack manufacturing method for manufacturing a battery pack having a pack housing and a battery module, the battery pack manufacturing method comprising:
  a preparing operation of loading the pack housing on a lifting mechanism;
  a supplying operation of supplying a feeding tray so that the battery module is located on a module support;
  a loading operation of loading the battery module on the module support;
  a separating operation of separating the battery module loaded on the feeding tray from an attaching and detaching mechanism;
  a lifting operation of moving the pack housing by the lifting mechanism so that the battery module is inserted into an inner space of the pack housing;
  a fastening operation of fastening the battery module and the pack housing to each other;
  a mounting operation of mounting the battery module fastened with the pack housing to the attaching and detaching mechanism; and
  a discharging operation of carrying the feeding tray to a next process in a state where the attaching and detaching mechanism to which the battery module fastened with the pack housing is mounted is loaded thereon,
  wherein the lifting mechanism includes a frame configured to mount the pack housing and a moving unit configured to move the frame, and
  wherein the frame has a perforated portion formed by opening a portion at a middle of the frame so that the module support passes through the middle of the frame when the battery module is being inserted into the inner space of the pack housing.

13. The battery pack manufacturing method according to claim 12, wherein the frame moves vertically relative to the module support, so that the module support passes from a top to a bottom of the perforated portion or from the bottom to the top of the perforated portion.

* * * * *